US011911936B2

(12) United States Patent
Darland et al.

(10) Patent No.: US 11,911,936 B2
(45) Date of Patent: *Feb. 27, 2024

(54) SINGLE-PHASE SOLUTION MOLDING

(71) Applicant: NIKE, Inc., Beaverton, OR (US)

(72) Inventors: Jeffrey E. Darland, Tigard, OR (US); Ryan Alvin Mace, Newberg, OR (US)

(73) Assignee: NIKE, Inc., Beaverton, OR (US)

(*) Notice: Subject to any disclaimer, the term of this patent is extended or adjusted under 35 U.S.C. 154(b) by 115 days.

This patent is subject to a terminal disclaimer.

(21) Appl. No.: 17/107,404

(22) Filed: Nov. 30, 2020

(65) Prior Publication Data
US 2021/0086412 A1 Mar. 25, 2021

Related U.S. Application Data

(63) Continuation of application No. 15/993,022, filed on May 30, 2018, now Pat. No. 10,850,434.
(Continued)

(51) Int. Cl.
B29C 44/04 (2006.01)
B29C 44/08 (2006.01)
(Continued)

(52) U.S. Cl.
CPC ........ *B29C 44/0415* (2013.01); *B29C 44/105* (2013.01); *B29C 44/3453* (2013.01);
(Continued)

(58) Field of Classification Search
CPC . B29C 44/0415; B29C 44/00; B29C 44/0407; B29C 44/105; B29C 44/3446;
(Continued)

(56) References Cited

U.S. PATENT DOCUMENTS 4,333,901 A * 6/1982 Young ................. B29C 45/1703
264/85
5,160,674 A 11/1992 Colton et al.
(Continued)

FOREIGN PATENT DOCUMENTS

CN 101830049 A 9/2010
CN 101879768 A 11/2010
(Continued)

OTHER PUBLICATIONS

Office Action received for European Patent Application No. 18734348.8, dated Jun. 20, 2022, 9 pages.
(Continued)

*Primary Examiner* — Stella K Yi
(74) *Attorney, Agent, or Firm* — Shook, Hardy & Bacon L.L.P.

(57) ABSTRACT

Aspects hereof provide methods for molding a single-phase solution comprised of a polymer composition and a gas. The polymer composition and the gas are maintained under pressure during the molding operation to prevent a cellular structure from being formed by the dissolved gas in the polymer composition coming out of solution. The mold cavity in which the single-phase solution is introduced for molding purposes is pressurized to a mold pressure that is sufficient to maintain the single-phase solution as a single-phase solution as the mold cavity is filled. Subsequent to filling the mold cavity with the single-phase solution under pressure, the resulting article may be exposed to a reduction in pressure causing the entrapped gas to form a cellular structure.

17 Claims, 4 Drawing Sheets

Related U.S. Application Data

(60) Provisional application No. 62/513,146, filed on May 31, 2017.

(51) Int. Cl.
  *B29C 44/10* (2006.01)
  *B29C 44/34* (2006.01)
  *B29C 45/00* (2006.01)
  *B29C 45/17* (2006.01)
  *B29K 23/00* (2006.01)
  *B29K 75/00* (2006.01)
  *B29K 101/12* (2006.01)
  *B29K 105/04* (2006.01)
  *B29K 105/24* (2006.01)

(52) U.S. Cl.
  CPC ............ *B29C 44/348* (2013.01); *B29C 44/08* (2013.01); *B29C 44/3492* (2013.01); *B29C 44/3496* (2013.01); *B29C 45/0001* (2013.01); *B29C 45/174* (2013.01); *B29K 2023/083* (2013.01); *B29K 2075/00* (2013.01); *B29K 2101/12* (2013.01); *B29K 2105/04* (2013.01); *B29K 2105/046* (2013.01); *B29K 2105/24* (2013.01)

(58) Field of Classification Search
  CPC . B29C 44/348; B29C 44/10; B29C 2045/566; B29C 48/0012; B29C 49/0029; B29C 66/9241; B29C 66/92431; B29C 67/0025; B29C 73/025
  See application file for complete search history.

(56) References Cited

U.S. PATENT DOCUMENTS

| | | | |
|---|---|---|---|
| 5,900,198 A | 5/1999 | Hori | |
| 6,146,577 A | 11/2000 | Yamaki et al. | |
| 6,290,883 B1 | 9/2001 | Crevasse et al. | |
| 8,500,426 B2 | 8/2013 | Chen et al. | |
| 2003/0015815 A1 | 1/2003 | Mcclelland et al. | |
| 2004/0198853 A1 | 10/2004 | Saito et al. | |
| 2007/0049649 A1 | 3/2007 | Lee et al. | |
| 2010/0198133 A1 | 8/2010 | Dougherty et al. | |
| 2012/0052143 A1 | 3/2012 | Chen et al. | |
| 2012/0061870 A1 | 3/2012 | Dougherty et al. | |
| 2012/0196115 A1* | 8/2012 | Choe | B29D 35/142 428/304.4 |
| 2013/0243986 A1* | 9/2013 | Girotti | C08G 18/225 428/36.5 |
| 2014/0275306 A1 | 9/2014 | Watkins et al. | |
| 2018/0345544 A1 | 12/2018 | Darland et al. | |

FOREIGN PATENT DOCUMENTS

| | | |
|---|---|---|
| CN | 102218783 A | 10/2011 |
| CN | 102770256 A | 11/2012 |
| CN | 103009540 A | 4/2013 |
| EP | 0634261 A1 | 1/1995 |
| EP | 1484149 A1 | 12/2004 |
| EP | 2516525 A1 | 10/2012 |
| WO | 01/64412 A2 | 9/2001 |
| WO | 2011/085847 A1 | 7/2011 |
| WO | 2014038609 A1 | 3/2014 |

OTHER PUBLICATIONS

Office Action received for European Patent Application No. 18734348.8, dated Feb. 7, 2022, 6 pages.
Intention to Grant received for European Patent Application No. 18734348.8, dated Mar. 27, 2023, 7 pages.

\* cited by examiner

SINGLE-PHASE SOLUTION MOLDING

CROSS-REFERENCE TO RELATED APPLICATIONS

This application is a Continuation Application of U.S. application Ser. No. 15/993,022, entitled "Single-Phase Solution Molding", and filed May 30, 2018, which claims the benefit of U.S. Provisional Application No. 62/513,146, entitled "Single-Phase Solution Molding," and filed May 31, 2017. The entirety of the aforementioned applications are incorporated by reference herein.

TECHNICAL FIELD

Production of a foamed article.

BACKGROUND

Polymer compositions may be foamed to provide a variety of advantages. A foamed polymer may be formed with a chemical or physical foaming agent that produces gas as they decompose or volatilize during a molding process. Therefore, parameters of the molding process may take into consideration parameters to allow a chemical foaming agent to generate gas that is sufficient to foam the polymer composition during molding.

BRIEF SUMMARY

Aspects hereof provide methods for molding a single-phase solution comprised of a polymer composition and a gas. The polymer composition and the gas are maintained under pressure during the molding operation to prevent a cellular structure from being formed by preventing the dissolved gas in the polymer composition coming out of solution. The mold cavity in which the single-phase solution is introduced for molding purposes is pressurized to a mold pressure that is sufficient to maintain the single-phase solution as a single-phase solution as the mold cavity is filled. Subsequent to filling the mold cavity with the single-phase solution under pressure, the resulting article may solidify entrapping the compressed gas in a solid article, or the article may be exposed to a sudden reduction in pressure causing the entrapped gas to exit the solution (e.g., nucleate), forming a cellular structure.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
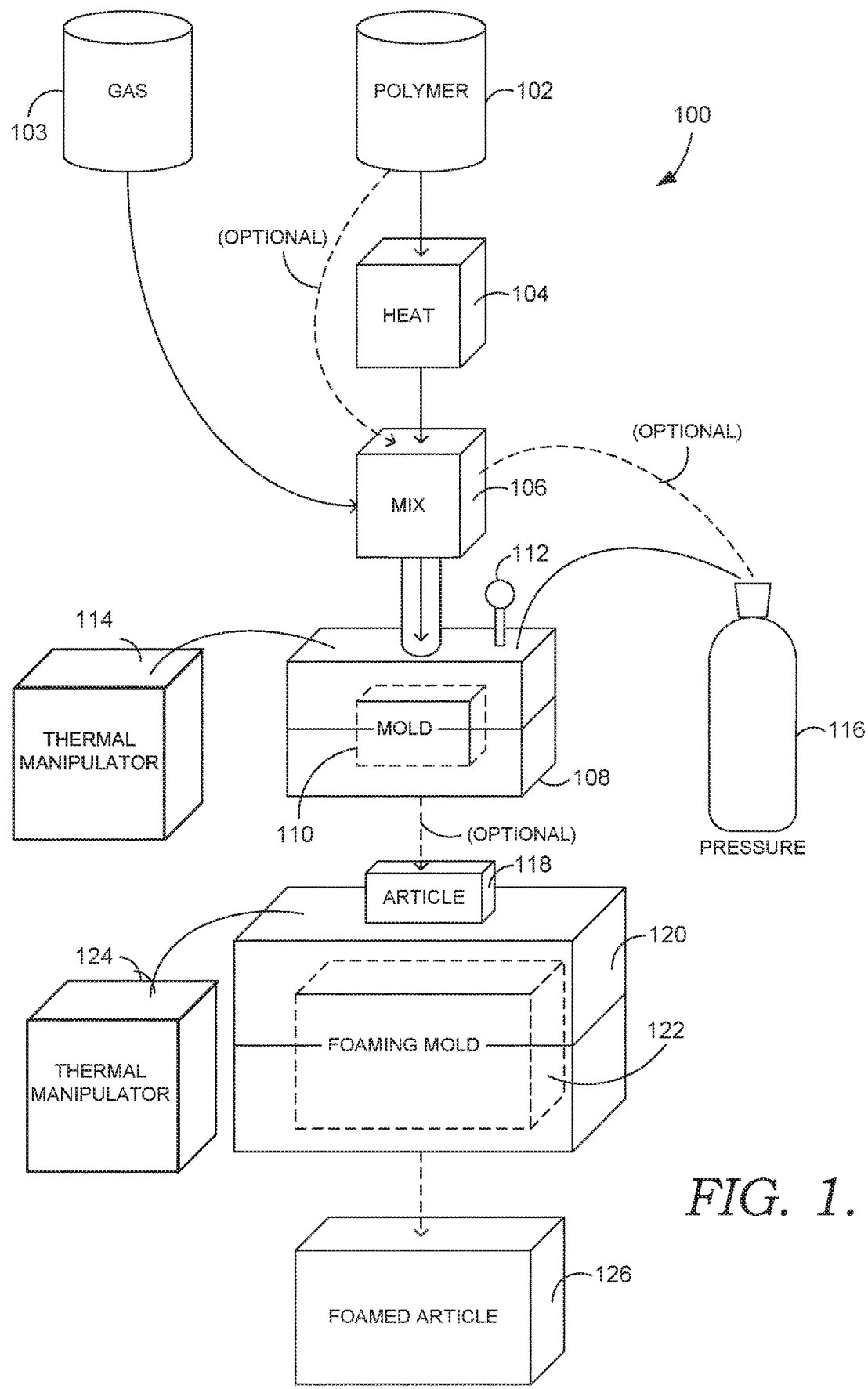
FIG. 1 depicts a system for molding a single-phase solution, in accordance with aspects hereof.

Foamed polymers may be formed with a foaming agent (e.g., blowing agent), which may be either a chemical foaming agent or a physical foaming agent. Both types of foaming agents operate by displacing a principle material, such as a polymer, during a molding process. Stated differently, a foaming agent is capable of producing a cellular structure via a foaming process in a material as the material changes states (e.g., a hardening of a polymer molded part). Foaming of a polymer can reduce the density of the resulting molded polymer part as voids are formed from the foaming agent that occupies space that would otherwise be filled with a denser polymer material.

Chemical foaming agents may be endothermic or exothermic, which refers to a type of decomposition they undergo to produce the gas for foaming. The decomposition may be a result of thermal energy in the system. Endothermic foaming agents absorb energy and typically release a gas, such as carbon dioxide, upon decomposition. Exothermic foaming agents release energy and generate a gas, such as nitrogen, when decomposed. Regardless of the chemical foaming agent used, thermal variables of the polymer composition being molded and thermal variables of the foaming agent to be decomposed are coupled together such that process parameters are selected so that the polymer can be molded and the foaming agent can decompose at an appropriate phase of the molding operation.

Coupling of the chemical foaming agent with the polymer to be molded results in process parameters that place limitations on a resulting foamed part. For example, temperatures and times that may not be ideal for the polymer are selected to achieve an appropriate decomposition of the chemical foaming agent. As such, use of a chemical foaming agent may introduce limitations in material selection, processing times, processing temperatures, and the like into a foam molding operation.

An example of a physical foaming agent includes a compressed gas element, such as carbon dioxide or nitrogen, that is introduced into the formable polymer (e.g., melted or at least above a glass transition temperature) as a super critical fluid (SCF). The polymer and the SCF are combined, such as in an injection molding screw, to form a single-phase solution that is maintained under sufficient pressure within the injection molding apparatus to keep the single-phase solution of polymer and SCF in a single-phase.

Upon injection into a mold from the injection molding apparatus, a sudden and intentional drop in pressure to atmospheric pressure causes a phase change of the SCF of the single-phase solution into a gas. This phase change foams the polymer as the polymer hardens and forms a cellular structure in the polymer. Because the sudden decrease in pressure causes the SCF to change phase (e.g., to a gas), the injection molding machine is formed with one or more valves to maintain a sufficient pressure within the injection molding apparatus as the single-phase solution is injected (e.g., shot) into the mold. Further, the injection molding apparatus has a relatively high shot volume capability for the part to be formed in order to evacuate the single-phase solution from the injection molding apparatus and to the mold in a quick manner as the rapid foaming occurs. The large shot volume and additional valves at the injection end of the injection molding apparatus can increase machine costs and limit production opportunities. Additionally, the processing limitations of having a coupling between melt temperatures and foaming temperatures can limit the material selection and resulting product characteristics.

A gas that is dissolved in a material, such as a polymer, may also serve as a physical foaming agent. A gas, such as carbon dioxide ($CO_2$) or nitrogen ($N_2$), may be introduced to a polymer composition in an injection molding (or extrusion) apparatus at a sufficiently high pressure such that the gas is solubilized into the polymer forming a single-phase solution. Like the SCF as a physical foaming agent example previously provided, the single-phase solution having a compressed gas is maintained at a sufficient pressure to maintain the gas in solution as a single-phase solution. When foaming of the polymer composition is desired, a pressure reduction can occur to bring the gas out of solution to form a two-part mixture of the polymer composition and the gas forming a cellular structure of foam.

Maintaining a sufficient pressure while in the mold and after being injected by the injection molding apparatus can allow for a decoupling of the foaming agent parameters from the polymer composition parameters. For example, when pressure is maintained sufficiently high within the mold, a single-phase solution can remain as a single-phase solution as the polymer composition hardens, cross-links, cures, or otherwise is formed. Therefore, processing parameters such as processing time (e.g., shot fill time, cross-linking time, hardening time) and temperature (e.g., mold temperature, part temperature) may be established to achieve a result for the polymer composition without accounting for traditional foaming variables. As such, sufficient cross-linking may occur at an acceptable rate without concern that the foaming agent over foamed, under foamed, incompletely foamed, and/or prematurely foamed.

Further, control of temperature allowed by decoupling the polymer composition variables from the foaming agent variables can allow for greater uniformity of the resulting cellular structure. For example, traditional injection molding can result in a denser skin and a less dense internal volume. This discrepancy in density is attributed to the polymers hardening at the mold cavity surfaces prior to sufficient foaming that results in the denser skin. Similarly, the internal volume hardens slower because of the thermal mass of the polymer composition, which can result in over foaming and also containment of the foam gas by the formed outer skin. Therefore, control of temperature independent of foaming agent variable during the polymer composition molding process can provide greater uniformity to the resulting cellular structure (e.g., by equalizing the thermal decay throughout the polymer composition to be molded).

Aspects hereof contemplated a method of molding a single-phase solution. The method includes forming the single-phase solution, such as through introduction of pressurized gas with a polymer composition that is above a glass transition temperature (e.g., melted) in an injection molding apparatus's barrel (e.g., screw) that is effective to mix and dissolve the gas with the polymer composition while under pressure. The method continues with pressurizing a mold cavity of a mold above atmospheric pressure to a mold pressure. Atmospheric pressure is a pressure of the environment in which the mold cavity is exposed (e.g., general environment pressure). The mold pressure is at least a pressure to maintain the single-phase solution as a single-phase. The method further includes injecting the single-phase solution into the pressurized mold cavity. The method also includes maintaining at least the mold pressure in the mold cavity during the injecting of the single-phase solution. As a result, the pressure in the mold cavity prevents the gas from coming out of solution to form a two-phase mixture (e.g., foaming) upon exit from the injection molding apparatus. As the pressure is maintained, premature foaming as the polymer composition is injected from the injection molding apparatus is avoided to allow a decoupling of process parameters associated with the foaming agent and the polymer composition.

Another aspect contemplated includes a method of molding a single-phase solution that includes mixing a polymer composition above a glass transition temperature of the polymer composition with a gas above atmospheric pressure to form the single-phase solution. The method includes pressurizing a mold cavity of a mold above atmospheric pressure to a mold pressure. The mold pressure is at least a pressure to maintain the single-phase solution as a homogeneous mixture. Stated differently, the pressure that the mold cavity is maintained at is sufficient to keep the gas in solution with the polymer composition. While maintaining the mold cavity at least at the mold pressure, the method continues with filling the mold cavity with the single-phase solution. Stated differently, because the mold cavity is maintained at the mold pressure, the gas stays in solution with the polymer composition and therefore does not convert to a two-phase mixture. Further, while maintaining the mold cavity at least at the mold pressure, the method includes chemically cross-linking the polymer composition while in the mold cavity. Unlike traditional foaming operations where the foaming action and chemical cross-linking occur concurrently, the present method decouples in time the cross-linking from the foaming to achieve different properties of the resulting polymer composition. The method also includes depressurizing the mold cavity to a depressurization pressure that converts the single-phase solution to a heterogeneous mixture comprised of the polymer composition and the gas. The heterogeneous mixture is a two-phase mixture where the gas has at least in part come out of solution to form the cellular network of the polymer composition as a foamed article.

Yet another aspect contemplates a method of molding a single-phase polymer and gas solution. The method includes mixing a polymer composition that is above a glass transition temperature of the polymer composition with a gas that is above atmospheric pressure to form the single-phase solution. The mixing may occur within an injection molding apparatus (e.g., a barrel, a hopper) or elsewhere (e.g., hardened polymer composition having dissolved gas contained therein). The method also includes pressurizing a first mold cavity of a mold above atmospheric pressure to a mold pressure. The mold pressure is at least a pressure suitable to maintain the single-phase solution as a homogeneous solution (e.g., gas is maintained in solution with the polymer composition to at least 50% or more of the original saturation of the single-phase composition). While maintaining the first mold cavity at least at the mold pressure, the method includes injecting the single-phase solution into the first mold cavity. The method includes cooling the single-phase solution below the glass transition temperature of the polymer composition having the gas dissolved therein to form a single-phase, solid article in the first mold cavity. Stated differently, foaming action is substantially prevented from occurring prior to the solidification of the polymer composition. Therefore, dissolved gas is maintained, at least in part, within the hardened polymer article having the shape of the mold cavity. The method also includes depressurizing the first mold cavity below the molding pressure after the hardening (e.g., cooling below 40 degrees Celsius) of the polymer composition sufficiently to maintain the dissolved gas in solution with the polymer composition.

The method may also include transferring the single-phase, solid article to a second mold having a second mold cavity. The second mold cavity in a first aspect has a larger volume than the first mold cavity. In an alternative aspect, the second mold is a similar size to the first mold cavity. The method also includes heating the single-phase, solid article within the second mold cavity to convert the single-phase, solid article to a foamed article. Stated differently, the single-phase article having captured pressurized gas is heated within the second mold cavity to allow for the foaming of the article to occur through the malleable conditions of the heated polymer composition.

FIG. 1 depicts an exemplary system 100 for molding a single-phase polymer and gas solution, in accordance with aspects hereof. The system 100 includes a polymer source 102. The polymer source 102 may be a selection of polymer composition pellets that are maintained in a molding apparatus, such as a hopper of an injection molding apparatus. A polymer composition is a composition comprised of a polymer. A polymer composition may also be comprised of chemical cross-linking agents, fillers, colorants, and the like. In an exemplary aspect, as provided herein, the polymer composition does not include a chemical foaming agent in sufficient quantities to commercially foam the polymer composition. Examples of polymer compositions include, but are not limited to, polyurethane, thermoplastic polyurethane, ethylene-vinyl acetate, polyolefin, co/ter-polymers of polyolefin, butane-based and octane-based copolymers, hydrogenated or halogenated polyolefin, polyamides, block copolymers of polyamides, ionomers, styrenic block copolymers, and rubber (e.g., ethylene propylene diene monomer, Nitrile rubber). Both thermoplastic and thermoset polymers are contemplated in various aspects herein. Additionally, various resins may be used in the polymer composition that can be cross-linked or not cross-linked. The amount of cross-linking at various stages may be varied. For example chemical and/or physical cross-linking may occur during injection into the mold, during foaming, and/or after foaming. In one example, the polymer composition remains sufficiently free of cross-links to allow for a re-melting of the article for subsequent foaming. After foaming, the cross-linking may increase to a point that makes re-melting difficult or impossible. Additional polymers are contemplated. For example, polymer composition comprising silicone.

The polymer composition may be in any form, such as pellets, beads, sheets, ingots, and the like. The polymer composition in the system 100 is introduced to thermal energy by a heating element 104. The heating element may be incorporated into a molding apparatus, such as an injection molding apparatus. The heating element 104 may heat the polymer composition with electric, gas, light (e.g., UV, IR, visible), ultrasonic, microwave, and other forms of energy. The polymer composition is heated above a glass transition temperature for the polymer composition. A glass transition temperature varies based on the polymer composition, but the temperature is sufficient to allow the polymer composition to be in a flowable state, such as at or above a melt temperature, in an exemplary aspect. In an exemplary aspect, the polymer composition is heated to a temperature range of 175 degrees Celsius to 205 degrees Celsius. However, depending on the polymer composition and other variables, the temperature may be varied.

The system 100 is comprised of a mixer 106. The mixer 106 is functional to agitate the polymer composition to achieve a uniform state. For example, if the polymer composition provided by the polymer source 102 is a heterogeneous mixture of elements, then the elements may be physically combined through an agitation process, such as mixing, by the mixer 106. In this example, the heating element 104 may bring the heterogeneous mixture to a melt temperature of the mixture such that the mixer 106 mixes melted elements into a polymer composition. The mixer 106 may be a screw within a barrel of an injection molding apparatus, in an exemplary aspect.

The system 100 is further comprised of a gas source 103. The gas source 103 may be a gas generator, a compressor, a tank, or the like. The gas source 103 is effective to provide a gas that will be used as a physical foaming agent in the system 100. For example, the gas source 103 may supply $CO_2$ or $N_2$. The gas source 103 may also be effective to supply the gas at a pressure (e.g., above 600 psi) to be dissolved into the polymer composition, such as at the mixer 106. Therefore, the gas source 103 may be able to provide a supercritical fluid (SCF) state of the "gas." For purposes of the present disclosure, a SCF state may be referred to as a "gas" in reference to the material within that SCF state intended to transition to a gaseous state during a foaming process. For example, a SCF $CO_2$ may be referred to as a "gas" as the $CO_2$ will transition into a gaseous state with a change in pressure during at least the foaming operation. Pressure is contemplated to be above a tank pressure for the selected gas. For example, for $N_2$, the pressure is at or above 600 psi as commercial tank pressure is generally below 600 psi. In aspects, the pressure is provided above 1,500 psi. This increase in the pressure may be accomplished through a compressor, a pump, or other mechanism.

The gas source 103 is fluidly coupled with the mixer 106 in an exemplary aspect. As such, the gas source 103 may provide a gas to the mixer 106 for integration with the polymer composition. The mixer 106 may mix the polymer composition with the pressurized gas to form a single-phase solution. A single phase solution is a solution where the physical properties are essentially uniform throughout. Therefore, a single-phase solution of polymer composition and gas is a homogenous combination having uniform characteristics. This is in contrast to a two-phase (or multi-phase) mixture where there are discrete materials that generate a heterogeneous mixture that lacks uniformity. For example, a two-phase mixture of polymer composition and gas occurs after foaming such that polymer composition and gas are discernible by the cellular framework generated after hardening.

As a single-phase solution is created and a drop in pressure can cause a single-phase solution of polymer composition and gas to convert to a two-phase mixture, it is contemplated that the mixer 106 is configured to maintain a pressure sufficient to maintain the single-phase solution in a single-phase (e.g., above 600 psi in a first aspect and above 1,500 psi in a second aspect). For example, if the mixer 106 is a barrel in an injection molding apparatus, the pressure within the barrel is maintained above a pressure sufficient to maintain the single-phase solution as a single-phase solution.

The system 100 is further comprised of a mold 108 having a mold cavity 110 and a pressure regulator 112. The mold cavity 110 forms the mold surface about which a polymer composition is shaped. The mold 108 is configured to maintain or generate a sufficient pressure within the mold cavity 110 to maintain a single-phase solution. For example, the mold 108 may be pressure sealed to maintain a pressure introduced, in an exemplary aspect. As used herein, the term "exemplary" is not limited to a preferred aspect, but instead merely an example of a contemplated aspect.

As a single-phase solution is injected (e.g., introduced) into the mold cavity 110, the single-phase solution consumes a volume of the mold cavity 110. As the volume is reduced, a pressure may continue to increase. An increase in pressure may prevent a complete shot or fill of the mold cavity. Therefore, aspects hereof contemplate the pressure regulator 112 bleeding pressure out of the mold cavity 110 as a single-phase solution is introduced and consumes a volume of the mold cavity 110. Therefore, it is contemplated that the pressure regulator 112 is effective to maintain a preset pressure (e.g., above 600 psi), such as a mold pressure, as the volume within the mold cavity 110 changes with the introduction of a single-phase solution.

As a single-phase solution is introduced into the mold cavity 110, the initial pressure of the mold cavity 110 should be at least a mold pressure that is sufficient to maintain the single-phase solution as a single-phase solution. A pressure source 116 may be fluidly coupled with the mold cavity 110 to introduce a sufficient pressure to prevent foaming of the single-phase solution upon introduction of the single-phase solution into the mold cavity 110. The pressure source 116 may be a tank, a compressor, or other pressure storage or generation source. The pressure source 116 may be any fluid, such as a liquid or gas. In an exemplary aspect, the pressure source 116 provides compressed atmospheric air, but it may be compressed $CO_2$, $N_2$, or other gases.

The pressure source 116 may optionally be coupled with the mixer 106 to provide pressure sufficient to maintain the single-phase solution in a single-phase solution at the mixer 106. Additionally or alternatively, the pressure within the mixer 106 may be generated by the gas source 103.

The mold 108 is fluidly coupled with the mixer 106, such as through an outlet port of a barrel from an injection molding apparatus, to maintain a pressure sufficient for a single-phase solution. Stated differently, a pressure decline from the mixer 106 to the mold 108 is avoided in some aspects to prevent a premature foaming of the single-phase solution as it transfers between the mixer 106 to the mold 108.

A thermal manipulator 114 may optionally be included in the system 100. The thermal manipulator 114 is effective to adjust a temperature (e.g., heat or cool) of the mold 108 during processing. As a result, the thermal manipulator 114 may be effective to accelerate a cycle time of the molding process for the polymer composition. For example, by cooling the mold 108, a volume of polymer composition contained in the mold cavity 110 is also cooled and brought from a malleable form (e.g., flowable) to a solid form in a faster cycle than if the thermal manipulator 114 were not present. As a chemical foaming agent that degrades (and therefore generates gas) in the presence of heat for defined times is omitted in exemplary aspects hereof, the use of the thermal manipulator 114 may be useable to reduce cycle time without affecting a foaming agent. The thermal manipulator 114 may alternatively or additionally be a heater for heating the mold 108 to affect a solidification characteristic of the single-phase solution. For example, by heating the mold, a skin having a different physical characteristic may be minimized by achieving a more uniform thermal decay of the single-phase solution from an internal portion to an external portion of the molded article, in an exemplary aspect.

In an aspect, it is contemplated that a plurality of polymer beads/pellets are delivered from the polymer source 102, such as a hopper, into a system having the heating element 104 and the mixer 106. The polymer beads are heated above a temperature at which they can be molded, such as above a glass transition temperature (e.g., to a melt temperature, but below a degradation temperature). The polymer beads are then mechanically mixed to form a homogeneous collection of polymer composition for eventual molding. A gas, such as $CO_2$ or $N_2$, is introduced to the polymer composition at pressure from the gas source 103. The gas is maintained at a pressure sufficient for the gas to be incorporated with the polymer composition as a single-phase solution. The incorporation may occur in the mixer 106 and the mixer 106 may be maintained at the pressure sufficient to maintain a single-phase solution. The single-phase solution is then introduced into the mold cavity 110 that is at a pressure sufficient to prevent foaming of the single-phase solution. Therefore, the single-phase solution can transition between the mixer 106 and the mold 108 without experiencing a sudden pressure drop that begins a nucleation causing foaming to occur. As the single-phase solution is introduced into the mold 108, the pressure regulator 112 maintains sufficient pressure without a significant pressure increase occurring as the volume of the mold cavity 110 is filled with the single-phase solution. The pressure maintained by the pressure regulator 112 may be adjusted for the particular (e.g., polymer composition, gas) single-phase solution.

At this point in the system 100, the molded article may be solidified to entrap and maintain the pressurized gas to form a single-phase, solid molded article. Or, alternatively, after the mold cavity 110 is substantially filled, the mold may be opened to the atmosphere allowing for a sudden expansion of the gas within the single-phase solution, which is also referred to as foaming the part. Each option with be discussed.

Starting with the sudden decompression prior to the molded article solidifying. In this example, the molded part is not net sized/shaped. For example, prior to foaming, the mold cavity 110 is filled with the single-phase solution to form a molded article defined by the size/shape of the mold cavity 110. After a sudden decompression, the single-phase solution that has yet to completely solidify converts to a multi-part mixture (e.g., a two-part mixture of gas and polymer composition). This conversion from a single-phase solution to a two-phase mixture increases the volume (e.g., decreases a density) of the molded article. Therefore, the resulting foamed article is larger than the mold cavity 110 in which it was formed. Unlike traditional foam molding operations where the resulting foamed part is sized and shaped to the mold cavity characteristics, the present aspect diverges from the mold cavity characteristics as the foaming occurs after the initial molding.

An exemplary implementation of the system 100 is in the manufacturing of footwear components, such as a sole. For example, an EVA, PU, or TPU composition may be formed into a single-phase solution having compressed $CO_2$ dissolved therein. The single-phase solution is then provided to a mold to form a shoe sole portion. However, the mold is not sized for the intended resulting shoe sole size. Instead, the mold is smaller in volume than the intended resulting shoe sole component. In this example, the mold cavity may be filled with the single-phase solution and the single-phase solution is allowed to chemically cross-link. After a sufficient cross-linking occurs, the shoe sole component is removed from the mold (or otherwise depressurized) causing the compressed gas to come out of solution and foam the part. The foaming action increases the volume of the shoe sole to a size greater than the mold cavity provided. The resulting foamed article may be used in a shoe as is or it may be subsequently processed, such as placed in a secondary mold for final shaping and sizing.

As provided above, another optional output from the system 100 is a single-phase, solid article that has been solidified and has not been foamed. In this example, the article is allowed to solidify within the mold 108 sufficiently to maintain compressed gas of the single-phase solution independently. Following the solidification, the mold 108 may be depressurized and a single-phase solid article 118 may be removed from the mold cavity 110.

The single-phase solid article 118 is an unfoamed article formed from the polymer composition from the polymer source 102 having a homogenous inclusion of compressed gas from the gas source 103 contained therein. A subsequent operation, such as heating of the article, raises the temperature of the single-phase solid article 118 sufficiently to allow for a physical change of the article for a foaming action to occur. In this example, the article may be heated to at least a glass transition temperature that allows the pressure of the contained compressed gas to expand and form a cellular structure for the article. The expansion of the gas results in an expansion of the article.

As depicted in FIG. 1, the single-phase solid article 118 may pass to a second mold 120 having a second mold cavity 122. The second mold 120 may be comprised of a thermal manipulator 124. The thermal manipulator 124 may be effective to raise the temperature of the single-phase solid article 118 while contained within the second mold cavity 122. Once the temperature of the single-phase solid article 118 is increased sufficiently, a pressure exerted by the compressed gas may form a cellular structure in the article resulting in a foamed article 126. The foamed article 126 is larger than the single-phase solid article 118 as a cellular structure (e.g., closed-cell structure) is formed as the gas comes out of solution in atmospheric pressure. For example, the foamed article 126 may expand to twice the volume (e.g., half the density) of the single-phase solid article 118. The foamed article 126 may then be placed in a controlled temperature environment to control contraction caused by the cooling of the foamed article. The natural contraction as the polymer composition reconstitutes from the second mold 120 operation can reduce the resulting article to a size less than (e.g., 5-20%) the foamed article 126 as formed by the second mold cavity 122. Controlling the thermal variables and timing can aid in limiting or forecasting the contraction that may occur.

While specific components and processes are depicted in FIG. 1, it is contemplated that they are illustrative in nature and not limiting. For example, elements depicted may be omitted, added, or rearranged in accordance with aspects hereof. Additional elements may be incorporated as well. Further, while some elements are depicted, they are optional for some aspects contemplated, regardless of listed as optional or not explicitly listed. Further, one or more connections may be formed between elements even when not specifically illustrated as having a connection in some aspects.

The single-phase solid article 118 may additionally be a carrier vessel for the entrapped gas. For example, systems or processes in which a pressurized gas is intended to be introduced may have the single-phase solid article 118 provided in a closed volume. Over time, the entrapped gas may leach out of the single-phase solid article 118 into a closed volume of the system to introduce the gas into that system.

Figure 2:
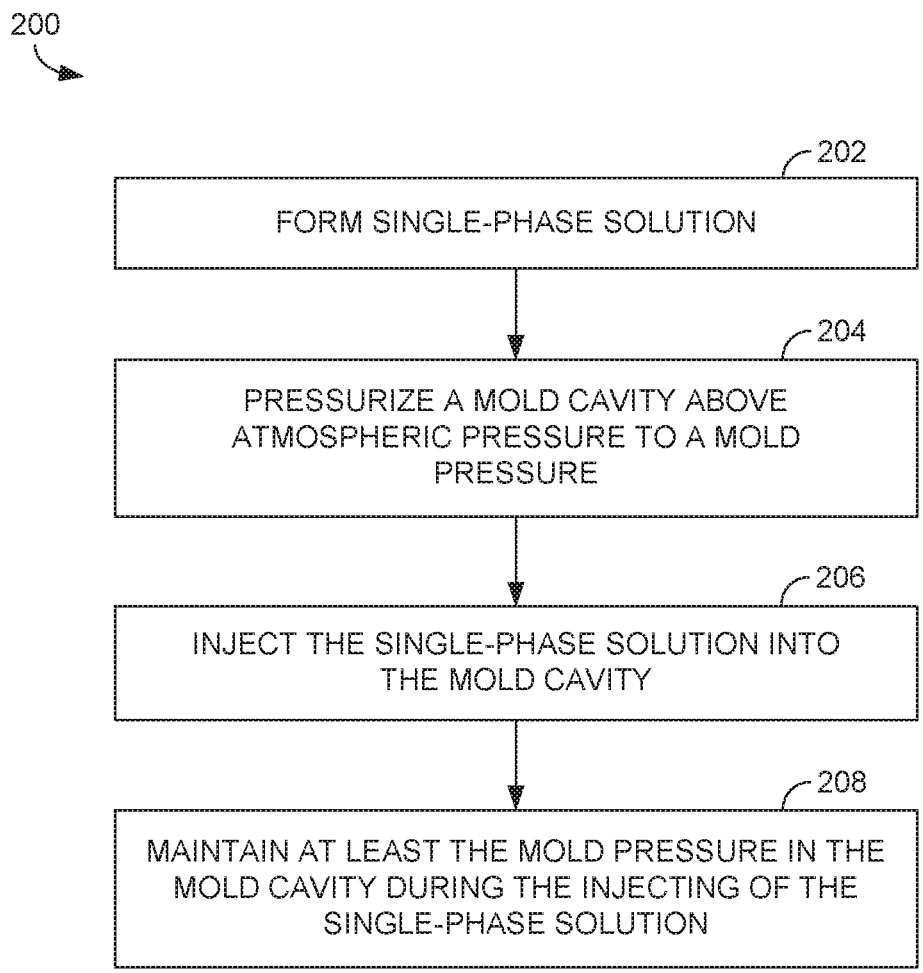
FIG. 2 depicts a method for molding a single-phase solution, in accordance with aspects hereof.

FIG. 2 depicts a flow diagram representing a method 200 for molding a single-phase solution, in accordance with aspects hereof. A block 202 includes forming a single-phase solution comprising a polymer composition and a compressed gas. The formation of a single-phase solution may occur with the polymer composition at (or above) a glass transition temperature, at (or above) a melt temperature, and/or at room temperature. Examples previously provided herein contemplate melting the polymer composition and mixing a compressed gas to form a homogenous, flowable, single-phase solution (e.g., a viscosity hat can be injection molded). Another contemplated way of forming a single-phase solution includes a solid polymer composition that is placed in a pressurized environment of the gas to be dissolved therein. The polymer composition absorbs the gas in the pressurized environment and is then provided to the manufacturing apparatus (e.g., injection molding apparatus) while being maintained under pressure until after being molded as a single-phase solution.

A block 204 represents pressurizing a mold cavity to a pressure above atmospheric pressure to a mold pressure. The mold pressure is a pressure sufficient to maintain at least some of the gas entrapped within the single-phase solution dissolved therein. For example, the mold pressure may be a pressure equal to a pressure at which the single-phase solution is formed. The mold pressure may also be a pressure equal to a pressure at which the single-phase solution is injected into the mold cavity. Regardless, the mold pressure is a pressure that prevents a foaming action from occurring in the single-phase solution, in an exemplary aspect.

A block 206 represents injecting the single-phase solution into the mold cavity. For example, an injection molding apparatus may maintain the single-phase solution under pressure in the barrel as it is injected into the pressurized mold. As a result, the single-phase solution does not experience a pressure differential that would encourage nucleation and foaming to occur during the molding process. Instead, the molding process may be adjusted for time and temperature of the polymer composition (e.g., cross-linking conditions) and not coupled with variables for foaming to occur. A block 208 represents maintaining at least the mold pressure in the mold cavity during the injecting of the single-phase solution. This maintenance of pressure ensures the foaming process occurs after the mold cavity has been filled, such as filled entirely or filled to at least 80% by mold-cavity volume, in an exemplary aspect. A mold-cavity volume is a volume of space into which the polymeric composition may flow or access during an injection operation. For example, a runner or sprue that is not obstructed (e.g., gated) during the molding process may be included in the mold-cavity volume. If, however, a portion of the mold cavity, such as a runner, is obstructed from polymer composition travel (e.g., flow of the polymer composition is obstructed by a mechanical barrier), the portion not accessible to the polymer composition may be omitted from the mold-cavity volume. In other aspects, when the mold-cavity volume defining the article itself and not all (or any) associated runners or sprues are filled, the mold cavity is substantially filled for purposes herein when discussing a volume of mold-cavity fill prior to depressurization.

From the block 208, the mold may be depressurized before the article solidifies to allow the article to foam. Or, the article may be allowed to solidify entrapping the compressed gas therein. In the latter example, the article may be later exposed to thermal energy allowing for the compressed gas to expand the article and foam the article.

A temperature at which the mold is depressurized may vary on an intended outcome of the article. For example, a single-phase solid article intended outcome may be allowed to cool to 50 degrees Celsius or lower before depressurizing the mold. For a cross-linked article intended to foam at the depressurization stage, the temperature of the article at depressurization may be above 130 degrees Celsius. For some cross-linked polymer compositions intended to foam at depressurization, the temperature may be above 150 degrees Celsius (e.g., cross-linked TPU or EVA). A demolding temperature for a non-cross-linked (e.g., TPU ionomeric materials) article that is intended to foam at depressurization may be cooler, such as between 100 degrees Celsius and 135 degrees Celsius.

Figure 3:
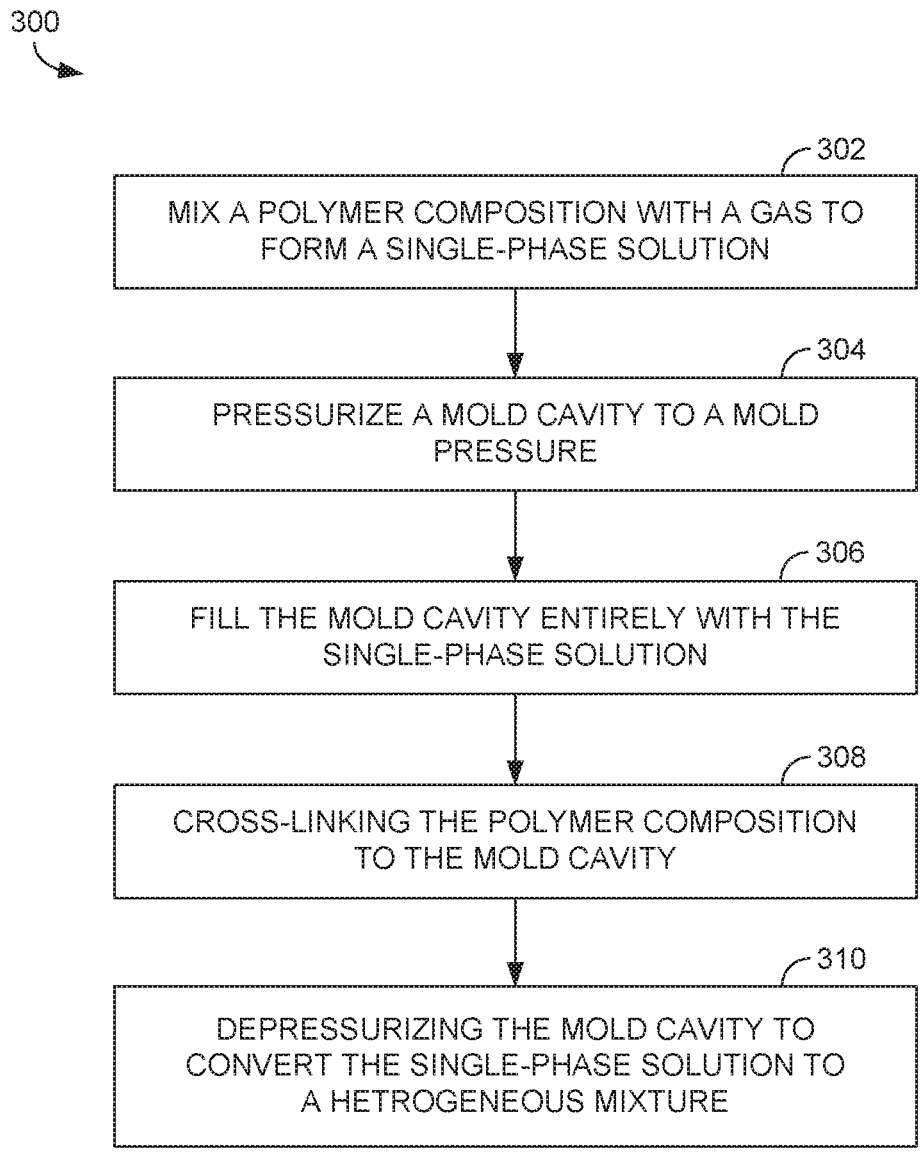
FIG. 3 depicts an exemplary method of molding a single-phase solution that is foamed after molding in a pressurized mold cavity, in accordance with aspects hereof.

FIG. 3 depicts a method 300 of molding a single-phase solution comprised of a polymer composition and a compressed gas, in accordance with aspects hereof. Specifically, the method 300 contemplates foaming the formed article after filling a mold cavity and prior to solidifying the article. Therefore, a block 302 represents mixing a polymer composition with a gas to form a single-phase solution. In this example, the single-phase solution is formed under pressure such that the gas is dissolved into the polymer composition forming the single-phase solution. A block 304 represents pressurizing a mold cavity of a mold to a mold pressure. The mold pressure is sufficient to maintain the single-phase solution as a single-phase solution when the mold cavity is filled with the single-phase solution, as depicted at a block 306. In this example, a cross-linking, chemical and/or mechanical, occurs in the mold cavity while maintaining the mold pressure, as depicted in block 308, A block 310 represents depressurizing the mold cavity to convert the single-phase solution to a heterogeneous mixture. Stated differently, the decompression of the mold cavity prior to solidification of the polymer composition allows from the compressed gas to form a cellular structure, such as closed-cell foam, of the polymer composition. In this example, the mold may be opened to allow the expanding article a volume into which it may expand. For example, prior to depressurizing the mold cavity, the mold cavity may be entirely or substantially entirely filled with the single-phase solution. If the mold cavity was depressurized without providing additional volume to expand, a uniform foaming process may not result. Further, by maintaining the mold cavity under pressure, the fill time and the cross-linking operation may be adjusted without affecting eventual foaming.

Figure 4:
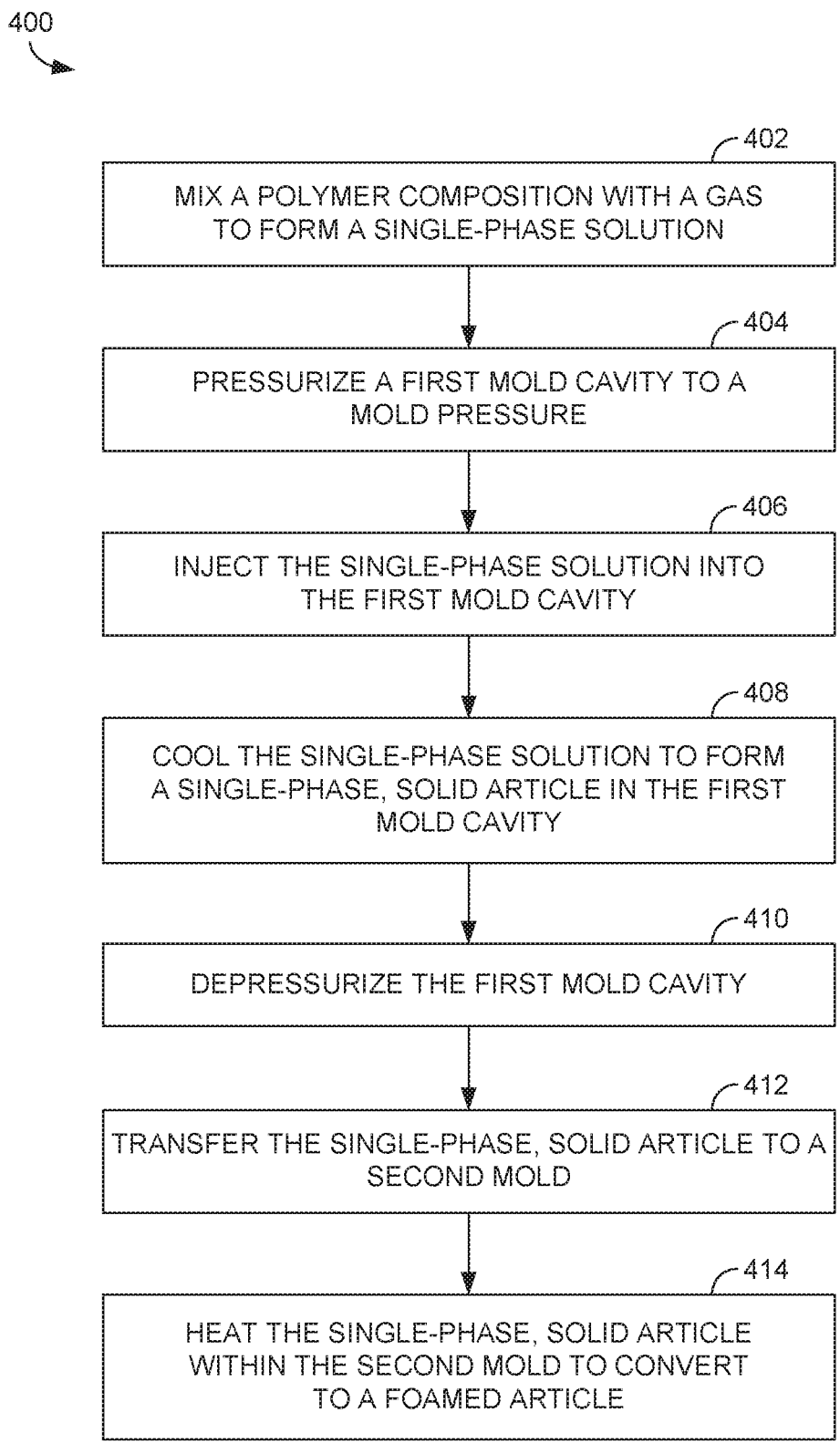
FIG. 4 depicts an exemplary method of molding a single-phase solution to form an article that entraps compressed gas prior to foaming, in accordance with aspects hereof.

FIG. 4 depicts a method 400 of molding a single-phase solution comprised of a polymer composition and a compressed gas, in accordance with aspects hereof. Specifically, the method 400 contemplates forming a single-phase solid article containing compressed gas that is subsequently foam molded to size and shape, in accordance with aspects hereof. A block 402 contemplates mixing a polymer composition with a compressed gas to form a single-phase solution, as previously discussed herein. A block 404 represents pressurizing a first mold cavity to a mold pressure. As previously discussed, the mold pressure is a pressure above atmospheric pressure that is sufficient to maintain the single-phase solution as a single-phase solution. A block 406 represents injecting the single-phase solution into the first mold cavity while the first mold cavity is maintained at or above mold pressure. A block 408 represents cooling the single-phase solution to form a single-phase solid article in the mold cavity. In this example, the compressed gas is entrapped in the polymer composition that has solidified. A block 410 represents depressurizing the first mold cavity after the article has sufficiently solidified to entrap the compressed gas.

A block 412 depicts a transferring of the single-phase solid article to a second mold. The transferring may be performed immediately or at any time subsequent. The second mold has a second mold cavity. The second mold cavity is larger than the single-phase solid article. Therefore, when the single-phase solid article is foamed and expands, the second mold cavity provides a molding volume for forming the resulting foamed article.

A block 414 represents heating the single-phase solid article while in the second mold cavity. The heating may be accomplished by heating the second mold itself. By heating the single-phase solid article, the polymer composition becomes physically deformable by the pressures exerted by the entrapped gas. This deformation allows the entrapped gas to expand and form a cellular structure in the polymer composition, which may be referred to as a foamed article. The second mold cavity may control and shape the resulting foamed article. Following foaming, the foamed article may be introduced to a temperature controlled environment (e.g., a heat tunnel) to control contraction of the foam article as it re-solidifies following foaming.

The processes provided herein are useable for forming a variety of articles, including single-phase solid articles and foamed articles that are greater than the initial molding cavity in which they are formed. The resulting foamed article may be implemented in a variety of industries and uses, for example, padding, apparel, equipment, automotive, electronics, aerospace, marine, medical equipment, and the like.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any elements and/or steps provided herein are contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A method of molding a footwear component using a single-phase solution, the method comprising:
    pressurizing a mold cavity of a footwear component mold above atmospheric pressure to a mold pressure, wherein the mold pressure is at least a pressure to maintain a single-phase solution as a single phase, wherein the single-phase solution is comprised of a polymer composition and a gas;
    injecting the single-phase solution into the mold cavity;
    maintaining at least the mold pressure in the mold cavity during the injecting of the single-phase solution; and
    cooling the polymer composition below a glass transition temperature of the polymer composition to form the footwear component,
    wherein the mold comprises a pressure regulator that maintains at least the mold pressure as the single-phase solution is injected into the mold cavity and wherein the mold cavity remains a constant volume,
    wherein the gas is selected from one of carbon dioxide ($CO_2$) and nitrogen ($N_2$).

2. The method of claim 1, further comprising forming the single-phase solution, wherein forming the single-phase solution comprises dissolving the gas with the polymer composition while the polymer composition is below the glass transition temperature.

3. The method of claim 1, further comprising forming the single-phase solution, wherein forming the single-phase solution comprises dissolving the gas with the polymer composition while the polymer composition is at least at the glass transition temperature.

4. The method of claim 3, wherein forming the single-phase solution comprises dissolving the gas with the polymer composition while the gas is in a supercritical fluid state.

5. The method of claim 3, wherein forming the single-phase solution comprises dissolving the gas with the polymer composition while the gas is above atmospheric pressure.

6. The method of claim 1, wherein the single-phase solution does not comprise a chemical-reaction foaming agent.

7. The method of claim 1, wherein the single-phase solution comprises a cross-linking agent.

8. The method of claim 1, further comprising heating the mold above an ambient temperature prior to injecting the single-phase solution.

9. The method of claim 1, further comprising filling the mold cavity at least 80% by mold-cavity volume with the single-phase solution.

10. The method of claim 9, wherein the single-phase solution is a homogenous mixture.

11. The method of claim 1, further comprising depressurizing the mold cavity.

12. The method of claim 1, where cross-linking of the polymer composition occurs prior to a foaming of the polymer composition.

13. A method of molding a footwear component using a single-phase polymer and gas solution, the method comprising:
   mixing a polymer composition above a glass transition temperature of the polymer composition with a gas above atmospheric pressure to form a single-phase solution;
   pressurizing a first mold cavity of a mold above atmospheric pressure to a mold pressure, wherein the mold pressure is at least a pressure to maintain the single-phase solution as a homogeneous solution;
   while maintaining the first mold cavity at least at the mold pressure, injecting the single-phase solution into the first mold cavity;
   depressurizing the first mold cavity below the molding pressure; and
   cooling the polymer composition below the glass transition temperature to form an article in the first mold cavity,
   wherein the mold comprises a pressure regulator that maintains at least the mold pressure as the single-phase solution is injected into the mold cavity and wherein the mold cavity remains a constant volume.

14. The method of claim 13, wherein the polymer composition is comprised of a polymer selected from one of polyurethane and ethylene-vinyl acetate.

15. The method of claim 14, wherein the gas is selected from one of carbon dioxide ($CO_2$) and nitrogen ($N_2$).

16. The method of claim 15, wherein the glass transition temperature is at least 175 degrees Celsius.

17. A method of molding a footwear component using a single-phase solution, the method comprising:
   pressurizing a mold cavity of a footwear component mold above atmospheric pressure to a mold pressure, wherein the mold pressure is at least a pressure to maintain a single-phase solution as a single phase, wherein the single-phase solution is comprised of a polymer composition and a gas;
   injecting the single-phase solution into the mold cavity;
   maintaining at least the mold pressure in the mold cavity during the injecting of the single-phase solution; and
   cooling the polymer composition below a glass transition temperature of the polymer composition to form the footwear component,
   wherein the mold comprises a pressure regulator that maintains at least the mold pressure as the single-phase solution is injected into the mold cavity and wherein the mold cavity remains a constant volume,
   wherein the polymer composition is comprised of a polymer selected from one of polyurethane and ethylene-vinyl acetate.

* * * * *